US011275347B2

(12) United States Patent
Kang et al.

(10) Patent No.: US 11,275,347 B2
(45) Date of Patent: Mar. 15, 2022

(54) HOME APPLIANCE AND METHOD FOR CONTROLLING THE SAME

(71) Applicant: Samsung Electronics Co., Ltd., Suwon-si (KR)

(72) Inventors: Hyosuck Kang, Suwon-si (KR); Daesung Kim, Suwon-si (KR); Sanghyeok Park, Suwon-si (KR); Jongkyoung Bok, Suwon-si (KR); Youngseok Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 232 days.

(21) Appl. No.: 16/708,954

(22) Filed: Dec. 10, 2019

(65) Prior Publication Data

US 2020/0183344 A1    Jun. 11, 2020

(30) Foreign Application Priority Data

Dec. 10, 2018    (KR) .................. 10-2018-0158565

(51) Int. Cl.
*G05B 15/02*    (2006.01)
*H04L 12/28*    (2006.01)
(52) U.S. Cl.
CPC ............ *G05B 15/02* (2013.01); *H04L 12/282* (2013.01); *H04L 12/2823* (2013.01); *G05B 2219/2642* (2013.01); *H04L 2012/285* (2013.01); *H04L 2012/2841* (2013.01)
(58) Field of Classification Search
CPC ............ G05B 15/02; G05B 2219/2642; H04L 12/282; H04L 12/2823; H04L 2012/2841; H04L 2012/285; H04L 12/2803; F25D 29/00
See application file for complete search history.

(56) References Cited

U.S. PATENT DOCUMENTS

| 9,270,115 | B2 | 2/2016 | Bosen et al. |
| 9,470,451 | B2 | 10/2016 | Kim et al. |
| 9,973,131 | B2 | 5/2018 | Lee et al. |
| 2012/0124401 | A1 | 5/2012 | Bosen et al. |
| 2013/0026955 | A1 | 1/2013 | Kikunaga et al. |

(Continued)

FOREIGN PATENT DOCUMENTS

| DE | 10 2009 027 800 A1 | 1/2011 |
| DE | 10 2016 223 950 A1 | 6/2018 |

(Continued)

OTHER PUBLICATIONS

International Search Report dated Mar. 19, 2020, in corresponding International Patent Application No. PCT/KR2019/017113.

(Continued)

*Primary Examiner* — Tejal Gami

(74) *Attorney, Agent, or Firm* — Staas & Halsey LLP

(57) ABSTRACT

A method for controlling a home appliance including a motor is provided. The control method includes acquiring, from another appliance, operating frequency information on a motor included in the another home appliance, identifying an operating frequency of the motor of the home appliance which differs from an operating frequency of the motor of the another home appliance based on the acquired operating frequency information, and controlling an operation of the motor of the home appliance based on the identified operating frequency.

18 Claims, 7 Drawing Sheets

(56) References Cited

U.S. PATENT DOCUMENTS

2016/0226426 A1    8/2016  Lee et al.
2016/0226676 A1    8/2016  Shin et al.

FOREIGN PATENT DOCUMENTS

| JP | 2002-85886 A | 3/2002 |
|----|----|----|
| JP | 2007-159263 | 6/2007 |
| JP | 2008-54911 A | 3/2008 |
| JP | 2013-187042 A | 9/2013 |
| JP | 2014-202121 A | 10/2014 |
| KR | 1995-0033372 | 12/1995 |
| KR | 1998-073243 | 11/1998 |
| KR | 10-2001-0047455 A | 6/2001 |
| KR | 10-0677879 | 2/2007 |
| KR | 10-2009-0048168 | 5/2009 |
| KR | 10-2016-0094719 A | 8/2016 |
| KR | 10-1663835 | 10/2016 |

OTHER PUBLICATIONS

Written Opinion of the International Searching Authority dated Mar. 19, 2020, in corresponding International Patent Application No. PCT/KR2019/017113.
Extended European Search Report dated Apr. 21, 2020, in corresponding European Patent Application No. 19213623.2.
Communication pursuant to Article 94(3) EPC, dated Dec. 7, 2021, issued in European Patent Application No. 19213623.2.

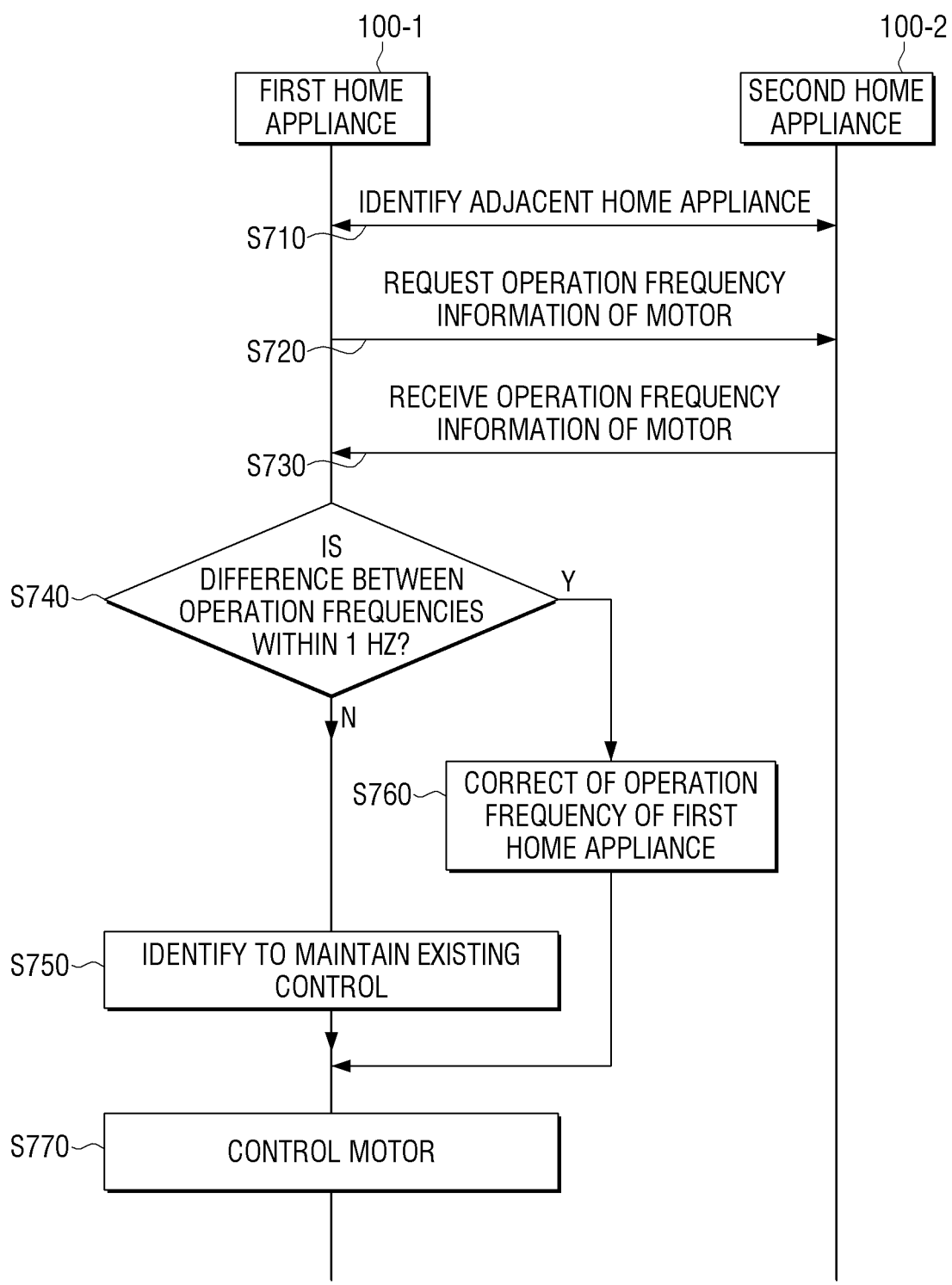

HOME APPLIANCE AND METHOD FOR CONTROLLING THE SAME

CROSS-REFERENCE TO RELATED APPLICATIONS

This application is based on and claims priority under 35 U.S.C. § 119 to Korean Patent Application No. 10-2018-0158565, filed on Dec. 10, 2018, in the Korean Intellectual Property Office, the disclosure of which is incorporated by reference herein in its entirety.

BACKGROUND

Field

Apparatuses and methods consistent with the disclosure relate to a home appliance and a method for controlling the same, and more particularly, to a home appliance and a method for controlling the same capable of acquiring operating frequency information of a motor of another home appliance and reduce noise by controlling an operation of the motor according to an operating frequency which differs from the acquired operating frequency.

Description of the Related Art

In general, a home appliance such as a refrigerator or a washing machine includes a motor for performing specific functions. In recent years, on the other hand, a plurality of home appliances with motors may be generally provided within one household. For example, a general refrigerator and a kimchi refrigerator may be provided within one household.

On the other hand, when the plurality of home appliances are provided in one household and the motors included in each home appliance operate according to similar operating frequencies, there is a problem in that a beat phenomenon occurs between noises generated from each home appliance to cause loud noise.

Therefore, the necessity of preventing the beat phenomenon that may occur when the plurality of home appliances are disposed at adjacent locations increases.

SUMMARY

Embodiments of the disclosure overcome the above disadvantages and other disadvantages not described above. Also, the disclosure is not required to overcome the disadvantages described above, and an embodiment of the disclosure may not overcome any of the problems described above.

The disclosure provides a home appliance and a method of controlling the same capable of acquiring operating frequency information of a motor of another home appliance and reducing noise by controlling an operation of the motor according to an operating frequency which differs from the acquired operating frequency.

According to the disclosure, a method for controlling a home appliance including a motor includes: acquiring, from another appliance, operating frequency information on a motor included in the another home appliance; determining an operating frequency of the motor of the home appliance which differs from an operating frequency of the motor of the another home appliance based on the acquired operating frequency information; and controlling an operation of the motor of the home appliance based on the determined operating frequency.

A home appliance includes: a motor; and a processor configured to acquire operating frequency information on a motor included in another home appliance from the another home appliance, identify an operating frequency of the motor which differs from an operating frequency of the motor of the another home appliance based on the acquired operating frequency information, and control an operation of the motor based on the identified operating frequency.

Additional and/or other aspects and advantages of the disclosure will be set forth in part in the description which follows and, in part, will be obvious from the description, or may be learned by practice of the disclosure.

BRIEF DESCRIPTION OF THE DRAWING FIGURES

The above and/or other aspects of the disclosure will be more apparent by describing certain embodiments of the disclosure with reference to the accompanying drawings, in which:

FIG. 7 is a sequence diagram for describing the method for controlling a home appliance according to the embodiment of the disclosure.

DETAILED DESCRIPTION OF THE EXEMPLARY EMBODIMENTS

Figure 1:
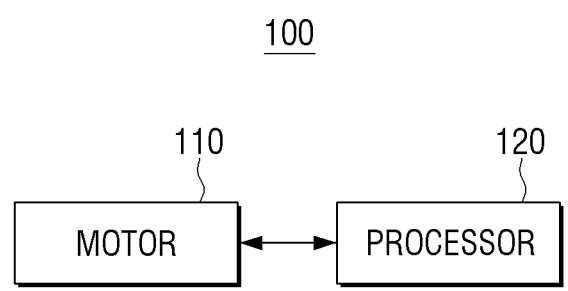
FIG. 1 is a block diagram for describing a simple configuration of a home appliance according to an embodiment of the disclosure.

After terms used in the specification are briefly described, the disclosure will be described in detail.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in embodiments of the disclosure should be defined on the basis of the meaning of the terms and the contents throughout the disclosure rather than simple names of the terms.

The disclosure may be variously modified and have several embodiments, and therefore specific embodiments of the disclosure will be illustrated in the drawings and be described in detail in the detailed description. However, it is to be understood that the disclosure is not limited to specific embodiments, but includes all modifications, equivalents, and substitutions without departing from the scope and spirit of the disclosure. When it is identified that a detailed description of the known art related to the disclosure may obscure the gist of the disclosure, the detailed description will be omitted.

Terms 'first', 'second', and the like, may be used to describe various components, but the components are not to be construed as being limited by these terms. The terms are used only to distinguish one component from another component.

Singular forms are intended to include plural forms unless the context clearly indicates otherwise. It will be further understood that terms "include" or "formed of" used in the specification specify the presence of features, numerals, steps, operations, components, parts, or combinations thereof mentioned in the specification, but do not preclude the presence or addition of one or more other features, numerals, steps, operations, components, parts, or combinations thereof.

Hereinafter, embodiments of the disclosure will be described in detail with reference to the accompanying drawings so that those skilled in the art to which the disclosure pertains may easily practice the disclosure. However, the disclosure may be modified in various different forms, and is not limited to embodiments described herein. In the drawings, parts irrelevant to the description are omitted to clarify the description of the disclosure.

Hereinafter, the disclosure will be described in more detail with reference to the drawings.

FIG. 1 is a block diagram for describing a simple configuration of a home appliance according to an embodiment of the disclosure.

Referring to FIG. 1, a home appliance 100 is configured to include a motor 110 and a processor 120.

The home appliance 100 is an apparatus in which vibration and noise may occur due to driving of the motor 110 during a process of performing a unique function. For example, the home appliance 100 may correspond to a washing machine, a refrigerator, a cleaner, or the like, but is not limited thereto.

The motor 110 is disposed in the home appliance 100 to drive a configuration related to performing a function of the home appliance 100. For example, when the home appliance 100 is a refrigerator, the motor 110 may start a refrigerant compressor that generates a refrigerant or a fan. As another example, when the home appliance 100 is a washing machine, the motor 110 may rotate a drum, in which laundry is accommodated, at high speed to dehydrate the laundry.

In addition, the motor 110 may rotate at various operating frequencies under control of the processor 120. The operating frequency of the motor 110 may be expressed using a unit of revolutions per minute (RPM).

The motor 110 may be an inverter motor capable of adjusting a rotation speed according to the operating frequency. However, the motor 110 is not limited thereto.

The processor 120 controls each component in the home appliance 100. In detail, when receiving a command for a specific function, the processor 120 may control an operation of a configuration related to performing the function.

For example, when the home appliance 100 is a refrigerator, the processor 120 may control the operation of the motor 110 to provide an additional torque to the refrigerant compressor when receiving a use command to lower a set temperature. As another example, when the home appliance 100 is a washing machine, the processor 120 may control the operation of the motor 110 to provide a torque to the drum in which the laundry is accommodated when receiving a dehydration command.

Meanwhile, the processor 120 may operate the motor 110 in a state where another home appliance with a motor is disposed at a location adjacent to the home appliance 100. In this case, when the operating frequency of the motor 110 has a similar value to the operating frequency of the motor of another home appliance, a beat phenomenon may occur between noises generated from the motors of the respective home appliances.

Here, the beat phenomenon is a phenomenon in which two waves having similar frequency interfere with each other and loudness of sound increases and decreases regularly. The noise caused by the beat phenomenon may adversely affect user's emotion.

Therefore, the processor 120 may prevent the beat phenomenon by controlling the operation of the motor 110 according to an operating frequency which differs from the operating frequency of the motor included in another home appliance.

Hereinafter, the detailed operation of the processor 120 for preventing the above-described beat phenomenon will be described.

First, the processor 120 may identify another home appliance disposed at a location adjacent to the home appliance 100. In detail, the processor 120 may identify whether there are other home appliances that can communicate with the home appliance to identify another home appliance disposed at an adjacent location.

For example, the processor 120 may identify whether there is another home appliance connected to the same network as a network to which the home appliance 100 is connected, or whether there is another home appliance capable of direct communication, such as Bluetooth, with the home appliance 100.

The processor 120 may perform an operation of identifying another home appliance disposed at a location adjacent to the home appliance 100 when a predetermined event occurs.

Here, the predetermined event may be at least one of a first turn-on event of the home appliance, an input event of the use command of the home appliance, an event that the home appliance 100 is connected to a new network, and an identify event of another new home appliance that can communicate with the home appliance 100, a connection release event of another home appliance that can communicate with the home appliance 100, and an arrival event of a predetermined time period.

On the other hand, the predetermined event is not limited to the above-described example, the event may be added according to the unique characteristics of the home appliance 100. For example, when the home appliance 100 is a refrigerator, an event detected that temperature around the refrigerator changes by a predetermined value or more may be added to the predetermined event.

The processor 120 may acquire operating frequency information on a motor included in another home appliance from another home appliance. In detail, the processor 120 may acquire operating frequency information on a motor included in another home appliance from the identified another home appliance as being disposed at an adjacent location.

More specifically, the processor 120 may request another home appliance 100 connected to the home appliance 100 by wire through a communication device 130, another home appliance connected to the same wireless network as the home appliance 100, or another home appliance capable of direct communication with the home appliance 100 for the operating frequency information on the motor included in another home application, and receive the operating frequency information from another home appliance.

Alternatively, the processor 120 may detect a sound generated while driving the motor of another home appliance through a microphone 140, and acquire the operating frequency information on the motor included in another home appliance from audio data corresponding to the detected sound. A detailed operation of the processor 120 acquiring the operating frequency information on the motor included in another home appliance using the microphone 140 will be described later with reference to FIG. 5.

The processor 120 may identify the operating frequency of the motor 110 which differs from the operating frequency of the motor of another home appliance based on the acquired operating frequency information. In detail, the processor 120 may identify the operating frequency of the motor 110 having a difference greater than or equal to a predetermined value from the operating frequency of the motor of another home appliance.

Herein, the predetermined value is a difference value between the operating frequencies for preventing noise caused by the above-described beat phenomenon, and may be about 2 Hz. Meanwhile, the predetermined value is not limited to the example described above.

Meanwhile, a detailed operation of identifying the operating frequency of the motor 110 which differs from the operating frequency of the motor of another home appliance will be described later with reference to FIGS. 3 and 4.

The processor 120 may control the operation of the motor 110 based on the identified operating frequency. Specifically, the processor 120 may use the identified operating frequency to control the operation of the motor 110 corresponding to the current cycle of the home appliance 100 or the operation of the motor 110 corresponding to the next cycle of the home appliance 100.

For example, when the current motor 110 identifies an operating frequency (B) which differs from the operating frequency of the motor of another home appliance during operation according to a specific operating frequency A, the processor 120 may change the operating frequency of the motor 110 from the specific operating frequency A to the identified operating frequency B.

As another example, when the current motor 110 identifies the operating frequency B which differs from the operating frequency of the motor of another home appliance during the operation according to the specific operating frequency A, the processor 120 may control the motor 110 to operate according to the identified operating frequency B instead of the specific operating frequency A during the operation corresponding to the next cycle.

Meanwhile, in illustrating and describing FIG. 1, the home appliance is illustrated and described as having one motor, but the home appliance may include a plurality of motors in implementation.

In addition, only the simple component configuring the home appliance are illustrated and described above, but in the implementation, various components may be additionally provided. This will be described below with reference to FIG. 2.

Figure 2:
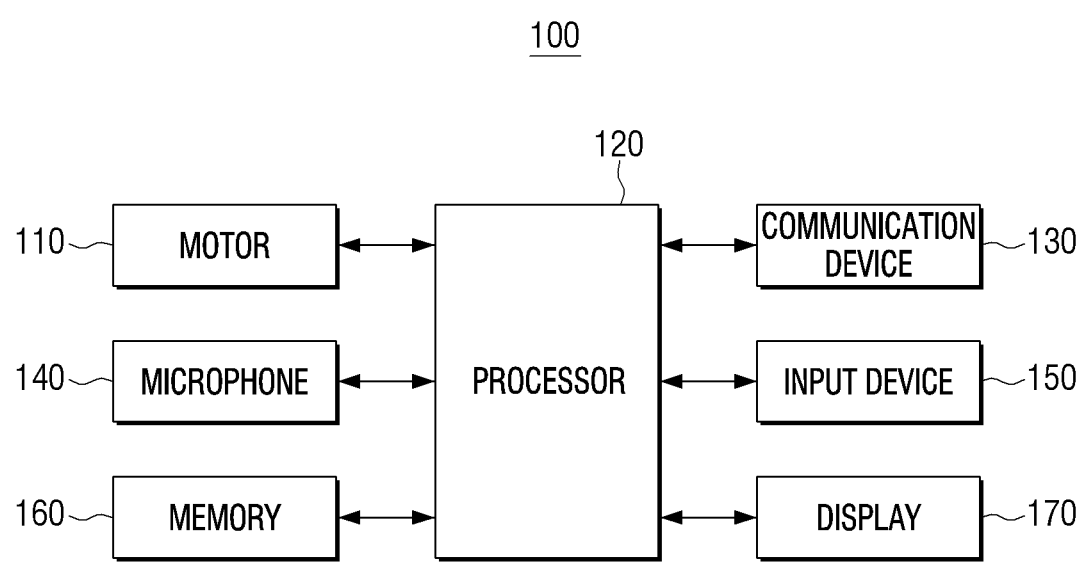
FIG. 2 is a block diagram for describing a detailed configuration of the home appliance according to the embodiment of the disclosure.

FIG. 2 is a block diagram illustrating a detailed configuration of the home appliance according to the embodiment of the disclosure.

Referring to FIG. 2, the home appliance 100 according to the embodiment of the disclosure may be configured to include a motor 110, a processor 120, a communication device 130, a microphone 140, an input device 150, a memory 160, and a display 170.

The motor 110 and the processor 120 perform the same functions as components illustrated in FIG. 1, and the duplicated description thereof will be omitted.

The communication device 130 may be connected to an external device (not illustrated) and receive various data from the external device. In detail, the communication device 130 can be formed to be connected to the external device through a local area network (LAN) and the Internet network or be connected to the external device through a universal serial bus (USB) port or a wireless communication (for example, WiFi 802.11a/b/g/n, NFC, Bluetooth) port. Here, the external device may be a home appliance, a PC, a laptop, a smartphone, a server, or the like.

The communication device 130 may request another home appliance connected to the home appliance 100 by wire, another home appliance connected to the same wireless network to which the home appliance 100 is connected, or another home appliance capable of direct communication with the home appliance 100 for the operating frequency information on the motor included in another home application, and receive the operating frequency information from another home appliance.

The microphone 140 may be disposed in the home appliance 100 to measure sound around the home appliance 100. For example, when the home appliance 100 supports a voice recognition function, the microphone 140 may detect user's spoken voice, and the processor 120 may use sound data corresponding to the detected voice to perform the voice recognition function.

The microphone 140 may detect a sound generated while driving the motor of another home appliance disposed at a location adjacent to the home appliance 100. The processor 120 may acquire the operating frequency information on the motor included in another home appliance from the sound data corresponding to the detected sound. The detailed operation of the processor 120 acquiring the operating frequency information on the motor included in another home appliance using the microphone 140 will be described later with reference to FIG. 5.

The input device 150 may include a plurality of function keys by which a user may set or select various functions supported by the home appliance 100. As a result, the user may input various driving commands for the home appliance 100. For example, when the home appliance 100 is a washing machine, the user may input a dehydration command of the washing machine through the input device 150.

The memory 160 stores various data for the overall operation of the home appliance 100, such as a program for processing or controlling the processor 120. In detail, the memory 160 may store a plurality of application programs driven by the home appliance 100 and data and instructions for operating the home appliance 100.

The memory 160 is accessed by the processor 120, and readout/recording/correction/deletion/update, and the like of data may be performed by the processor 120. The memory 160 may be implemented as an external storage medium, a removable disk including a USB memory, a web server though a network, and the like in addition to a storage medium in the home appliance 100.

The memory 160 may store information on another home appliance 100 adjacent to the home appliance 100. In detail, the memory 160 may store information on another home appliance connected to the home appliance 100 by a wire, another home appliance connected to the same network as the wireless network to which the home appliance 100 is connected, or another home appliance capable of direct communication, such as Bluetooth, with another home appliance.

In this case, the information on another home appliance may include the information on the operating frequency information of the motor included in another home appliance as well as a name and type of another home appliance, but is not limited to thereto.

The memory 160 may store a speed control table of the motor 110. Here, the speed control table is a table having the information on the operating frequency according to the time of the motor 110 in response to a specific function of the home appliance 100.

For example, when the home appliance 100 is a washing machine, the memory 160 may store the speed control table having the information on the operating frequency according to the time of the motor 110 in response to the dehydration function of the washing machine. In addition, when the home appliance 100 is a cleaner, the memory 160 may store the speed control table having the information on the operating frequency according to the time of the motor 110 in response to a suction level set by a user.

The speed control table may include not only a specific function but also the information on the operating frequency identified based on at least one of environmental information of the home appliance 100 and setting information input from a user.

Here, the environmental information means the information on the surrounding environment of the home appliance 100 and may include various information such as temperature information and humidity information. In addition, the setting information may refer to setting information input from a user, and may include information on a user's use command for a specific function.

For example, when the home appliance 100 is a refrigerator, the environmental information may be the inside temperature of the refrigerator or the outside temperature of the refrigerator, and the setting information may be a user setting temperature or the like for a refrigerating function or a cooling function.

The speed control table may further include information on an operating frequency range corresponding to the specific function, the environmental information, the setting information, and the like. The processor 120 may identify an operating frequency range corresponding to at least one of the specific function, the environmental information, and the setting information, identify one frequency within the corresponding frequency range, and control the motor 110 to operate at the identified frequency.

For example, when the operating frequency of the specific function of the home appliance 100 has a range of 55 to 60 Hz, the processor 120 may select one of the frequencies of 55 to 60 Hz, for example, 58 Hz, and control the motor 110 to operate at 58 Hz.

In addition, when the home appliance 100 includes the plurality of motors 110, the memory 160 may store speed control tables for each of the plurality of motors 110.

The display 170 may display various information provided from the home appliance 100. In detail, the display 170 may display an operation state of the home appliance 100 or a user interface window for selecting a function and an option selected by the user.

For example, if the home appliance 100 is a refrigerator, the display 170 may display the interface window to display that the refrigerator is performing a refrigeration operation according to a set temperature, or to enable a user to select whether to operate a function such as power freezing.

Meanwhile, in illustrating and describing FIG. 2, the microphone 140 is illustrated and described as being provided in the home appliance 100, but the microphone 140 may be provided separately from the home appliance 100.

Conventionally, when a plurality of home appliances including motors are disposed at adjacent locations, and the motors of the plurality of home appliances operate according to similar operating frequencies, there is a problem in that a beat phenomenon occurs between noises generated from each home appliance to cause loud noise.

On the other hand, as described above, the home appliance according to the disclosure controls the motor according to the operating frequency which differs from the operating frequency of the motor included in another home appliance disposed at an adjacent location, thereby making it possible to prevent the beat phenomenon that may be caused by the motors operating at the similar operating frequencies.

Figure 3:
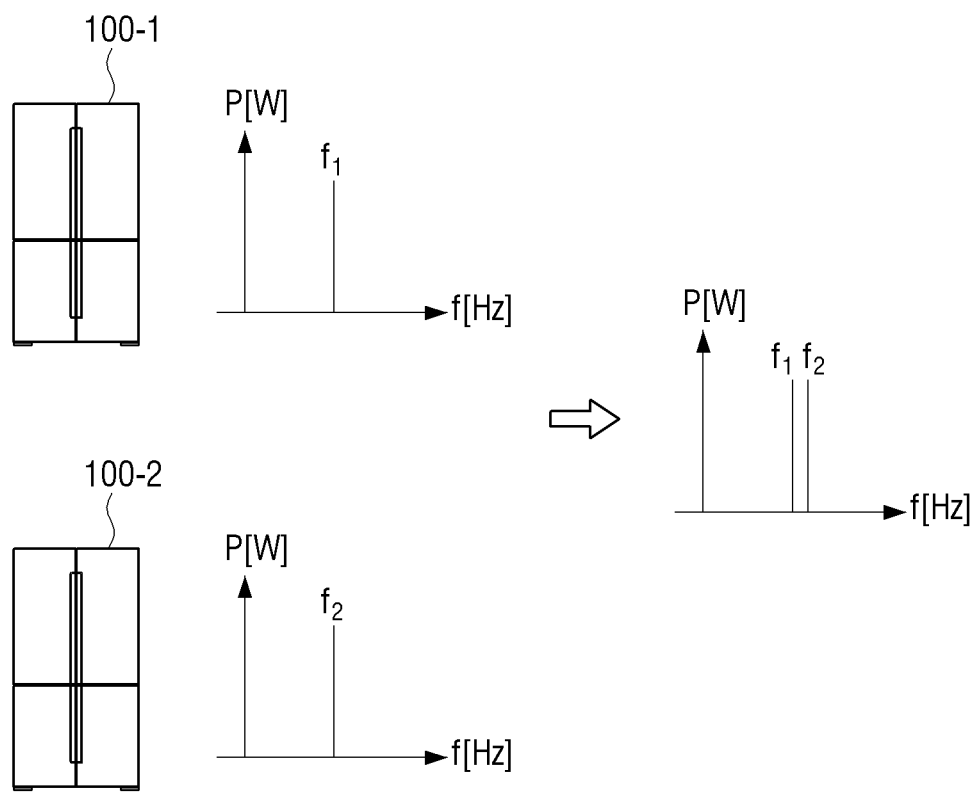
FIGS. 3 and 4 are diagrams for describing a beat phenomenon occurring when a plurality of home appliances are adjacent and a method for preventing the beat phenomenon.
Figure 4:
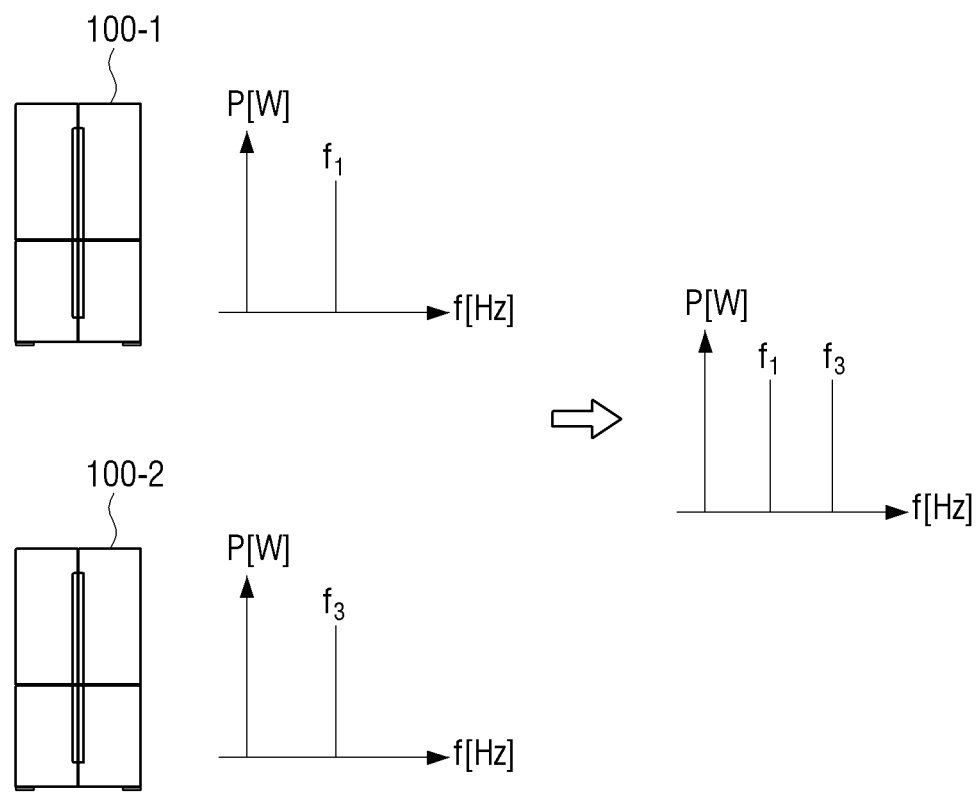

FIGS. 3 and 4 are diagrams for describing a beat phenomenon occurring when a plurality of home appliances are adjacent and a method for preventing the beat phenomenon.

Referring to FIG. 3, first, it may be identified that a plurality of home appliances 100-1 and 100-2 are disposed at adjacent locations. The first home appliance 100-1 may operate a motor according to an operating frequency f1, and the second home appliance 100-2 may operate a motor according to an operating frequency f2.

In this case, when the operating frequency f1 and the operating frequency f2 are similar, for example, have a difference of about 1 Hz, a beat phenomenon may occur that sound increases or decreases periodically as sounds generated from each of the first home appliance 100-1 and the second home appliance 100-2 overlap.

To prevent the beat phenomenon, the plurality of home appliances 100-1 and 100-2 may control the respective motors based on operating frequencies different enough to prevent the beat phenomenon. In detail, one home appliance (100-2) of the plurality of home appliances 100-1 and 100-2 may identify an operating frequency which sufficiently differs from the operating frequency by using the operating frequency information of the motor of the other home appliance 100-1, and control the motor 110 to operate at the operating frequency.

Referring to FIG. 4, it may be identified that the second home appliance 100-2 operates the motor according to an operating frequency f3 which differs from the operating frequency f1 of the first home appliance 100-1. Hereinafter, a method for identifying an operating frequency of the second home appliance 100-2 based on the operation of the processor 120 of the second home appliance 100-2 will be described.

First, the processor 120 may acquire the operating frequency information of the motor included in the first home appliance 100-1 through the communication device 130.

The processor 120 may identify the operating frequency of the motor 110 of the second home appliance 100-2 based on at least one of the environmental information and the setting information.

Here, the environmental information refers to information on the surrounding environment of the home appliance 100 and may include various information such as temperature information and humidity information. In addition, the setting information may refer to setting information input from a user, and may include information on a user's use command for a specific function.

For example, when the second home appliance 100-2 is a refrigerator, the processor 120 may identify the operating frequency of the motor 110 based on the ambient temperature information, the internal temperature information of the refrigerator, and the set temperature information of the user.

On the other hand, when the memory 160 stores the speed control table of the motor 110, the processor 120 may identify the operating frequency corresponding to the environmental information or the setting information by referring to the speed control table.

In addition, the speed control table may further include information on an operating frequency range corresponding to the specific function, the environmental information, the setting information, and the like. Here, the operating frequency range is an operating frequency range that the motor 110 may have to achieve targeted effects in response to the specific function, the environmental information, the setting information, and the like. The processor 120 may identify one operating frequency within a corresponding operating frequency range.

The processor 120 may identify whether the identified operating frequency is similar to the operating frequency of the motor included in the first home appliance 100-1. In detail, the processor 120 may identify whether the difference between the identified operating frequency and the operating frequency of the motor included in the first home appliance 100-1 is within the predetermined difference.

For example, when the difference between the identified operating frequency and the operating frequency of the motor included in the first home appliance 100-1 is less than 1 Hz, the processor 120 may identify that the operating frequencies for the plurality of home appliances 100-1 and 100-2 are similar.

If the difference between the identified operating frequency and the operating frequency of the motor included in the first home appliance 100-1 is greater than the predetermined difference, it may be considered that the beat phenomenon does not occur, such that the processor 120 may control the operation of the motor 110 according to the identified operating frequency.

On the other hand, if the difference between the calculated operating frequency and the operating frequency of the motor included in the first home appliance 100-1 is smaller than the predetermined difference, there may be a possibility that the beat phenomenon may occur, such that the processor 120 may correct the identified operating frequency.

In detail, the processor 120 may correct the operating frequency identified so that the difference between the identified operating frequency and the operating frequency of the motor included in the first home appliance 100-1 is greater than or equal to the predetermined value. Herein, the predetermined value is a difference value between the operating frequencies for preventing noise caused by the above-described beat phenomenon, and may be about 2 Hz.

For example, when the identified operating frequency is 50 Hz and the operating frequency of the motor included in the first home appliance 100-1 is 51 Hz, the processor 120 may correct the identified operating frequency to 49 Hz or 53 Hz.

When the operating frequency is corrected, the processor 120 may correct the operating frequency to a value smaller or greater than the operating frequency of the motor included in the first home appliance 100-1 by the predetermined value according to a predetermined criterion. Herein, the predetermined criterion may be a criterion set based on the environmental information or the setting information, and may be changed according to manufacturer or user setting.

For example, the second home appliance 100-2 may be a refrigerator, the motor 110 may be a motor of a refrigerant compressor, and the predetermined criterion may be an internal temperature of the refrigerator. In this case, when the internal temperature of the refrigerator is high, the processor 120 may correct the operating frequency to a value greater than the operating frequency of the motor included in the first home appliance 100-1 by the predetermined value to perform a fast refrigeration function. On the other hand, when the internal temperature of the refrigerator is low, the processor 120 may correct the operating frequency to a value greater than the operating frequency of the motor included in the first home appliance 100-1 by the predetermined value.

When the operating frequency is corrected, the processor 120 may correct the identified operating frequency within the corresponding operating frequency range by using the information on the operating frequency range included in the speed control table.

For example, when the corresponding operating frequency range is 55 to 60 Hz, the identified frequency is 56 Hz, and the operating frequency of the motor included in the first home appliance 100-1 is 55 Hz, the processor 120 may correct the operating frequency to 57 Hz which differs from 55 Hz by 2 Hz and is included within 55 to 60 Hz.

Meanwhile, it may occur that a suitable operating frequency may not be identified when correcting the operating frequency identified by considering the operating frequency range.

For example, when the operating frequency range is 56 to 58 Hz, the identified operating frequency is 56 Hz, and the operating frequency of the motor included in the first home appliance 100-1 is 57 Hz, the operating frequency which differs from 57 Hz by 2 Hz needs to be 55 Hz or less or 59 Hz or more, such that the processor 120 may not correct the operating frequency identified within the operating frequency range.

In addition, the motor may not operate according to the corrected operating frequency due to the limitation of the characteristics of the home appliance itself.

In this case, the processor 120 may control the operation of the motor 110 according to the operating frequency identified based on at least one of the environmental information and the setting information, but may request the first home appliance 100-1 to change the operating frequency through the communication device 130. In detail, the processor 120 may transmit the identified operating frequency information to the first home appliance 100-1 and request the first home appliance 100-1 to change the operating frequency.

When the information on the operating frequency of the motor included in the first home appliance 100-1 has a plurality of operating frequencies that change with time, the processor 120 may correct the operating frequency identified so that a difference from each of the plurality of operating frequencies is greater than a predetermined value.

For example, when the information on the operating frequency of the motor included in the first home appliance 100-1 includes the contents that the motor operates at 60 Hz for 40 minutes and operates at 55 Hz for 10 minutes, the processor 120 may correct the operating frequency so that a difference from 60 Hz and 55 Hz, respectively, is 2 Hz or more. Alternatively, the processor 120 may correct the operating frequency so that a difference from 60 Hz by 2 Hz or more occurs when the motor operates for 40 minutes, and correct the operating frequency so that a difference from 55 Hz is 2 Hz or more when the motor operates for 10 minutes.

The processor 120 may control the operation of the motor 110 based on the corrected operating frequency. Meanwhile, when the identified operating frequency may not be corrected, the processor 120 may control the operation of the motor 110 based on the identified operating frequency.

Meanwhile, the first home appliance 100-1 may include a plurality of motors, and the second home appliance 100-2 may include one motor. In this case, the processor 120 may acquire a plurality of operating frequency information on each of the plurality of motors from the first home appliance 100-1.

The processor 120 may identify the operating frequency which differs from the operating frequencies for the plurality of motors of the first home appliance 100-1 based on the acquired operating frequency information. The operation of the motor 110 may be controlled according to the identified operating frequency.

For example, when the acquired plurality of operating frequencies are 45 Hz and 48 Hz, respectively, the processor 120 may identify, as the operating frequency, 50 Hz which is a frequency that differs by 2 Hz or more when compared with 45 Hz and 48 Hz, respectively.

In addition, the first home appliance 100-1 may include one motor, and the second home appliance 100-2 may include the plurality of motors 110-1 and 110-2. In this case, the processor 120 may acquire an operating frequency corresponding to one motor from the first home appliance 100-1.

The processor 120 may identify the operating frequencies for each of the plurality of motors 110-1 and 110-2 of the second home appliance 100-2 which differs from the operating frequency of the motor of the first home appliance 100-1 based on the acquired operating frequency information. The operations for each of the motors 110-1 and 110-2 may be controlled according to the plurality of identified operating frequencies.

For example, when the acquired operating frequency is 48 Hz and the second home appliance 100-2 includes two motors, the processor 120 may identify, as the operating frequencies for each of the plurality of motors, frequencies of 45 Hz and 50 Hz which differ from the 48 Hz by 2 Hz or more. This can be identified by the operating frequency of each motor.

As described above, the second home appliance 100-2 may prevent the beat phenomenon by identifying the operating frequency of the motor 110 based on the operating frequency of the motor included in the first home appliance 100-1.

Meanwhile, which of the plurality of home appliances 100-1 and 100-2 performs the above-mentioned beat phenomenon preventing operation may be identified through the communication between the plurality of home appliances 100-1 and 100-2.

In detail, when it is identified that the plurality of home appliances 100-1 and 100-2 are disposed at adjacent locations to each other through the communication, it is possible to identify a device to perform the above-described beat phenomenon preventing operation according to the predetermined criterion.

For example, the plurality of home appliances 100-1 and 100-2 may share specification information of each other and identify a device having a higher specification as a device to perform the beat phenomenon preventing operation. As another example, the plurality of home appliances 100-1 and 100-2 may identify, as a device to perform the beat phenomenon preventing operation, a device to perform the operation of the motor later between the plurality of home appliances 100-1 and 100-2.

Meanwhile, in illustrating and describing FIGS. 3 and 4, a method for preventing a beat phenomenon in a relationship between two home appliances is illustrated and described, but in the implementation, the beat phenomenon can be prevented using the same method even in the relationship between three or more home appliances.

Figure 5:
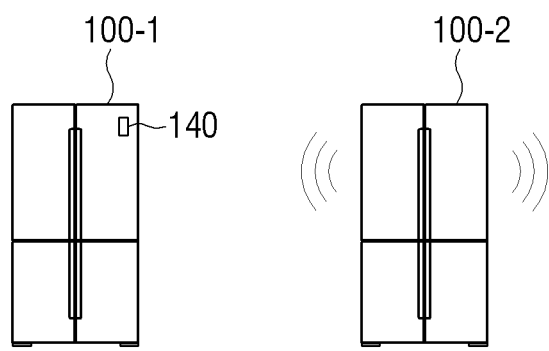
FIG. 5 is a diagram for describing an operation of acquiring operating frequency information of another home appliance using a microphone.

FIG. 5 is a diagram for describing an operation of acquiring operating frequency information of another home appliance using a microphone.

Referring to FIG. 5, the first home appliance 100-1 may be disposed at a position adjacent to the second home appliance 100-2 and may include the microphone 140. Hereinafter, a method for acquiring an operating frequency of the second home appliance 100-2 based on the operation of the processor 120 of the first home appliance 100-1 will be described.

First, the processor 120 may detect a sound generated during the driving of the motor of the second home appliance 100-2 using the microphone 140. In detail, when receiving a driving start signal of the motor from the second home appliance 100-2, the processor 120 may use the microphone 140 to detect a sound generated during the driving of the motor of the second home appliance 100-2.

The processor 120 may acquire the operating frequency information on the motor included in the second home appliance 100-2 from the sound data corresponding to the detected sound. In detail, the processor 120 may perform Fourier transform of sound data into a frequency domain and acquire the operating frequency information from the transformed result.

More specifically, the processor 120 may perform short time Fourier transform (STFT) of the sound data into the frequency domain, identify a time having maximum power from the transformed result, and acquire, as the operating frequency, the frequency having the largest magnitude in the corresponding time zone.

The processor 120 may identify different operating frequencies based on the acquired operating frequency information.

Figure 6:
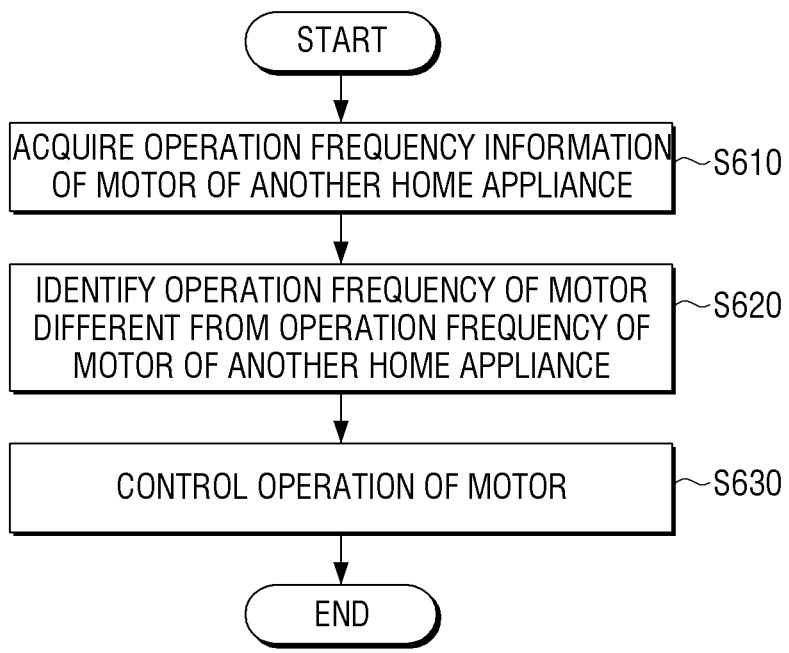
FIG. 6 is a flowchart for describing a method for controlling a home appliance according to an embodiment of the disclosure.

FIG. 6 is a flowchart for describing the method for controlling a home appliance according to the embodiment of the disclosure.

Referring to FIG. 6, first, operating frequency information on a motor included in another home appliance is acquired from another home appliance (S610). Meanwhile, another home appliance adjacent to a home appliance may be identified prior to acquiring the operating frequency information on the motor included in another home appliance. The operating frequency information on the motor included in the identified another home appliance may be acquired from the identified another home appliance.

In detail, another home appliance connected to the same network as the home appliance or another home appliance capable of direct communication with the home appliance may be identified. The operating frequency information on the motor included in the identified another home appliance may be requested to the identified another home appliance, and the operating frequency information on the motor included in the identified another home appliance may be received from the identified another home appliance.

When the home appliance is provided with a microphone, the sound generated during the driving of the motor of another home appliance may be detected through the microphone. The operating frequency information on the motor included in the identified another home appliance may be acquired from the sound data corresponding to the detected sound. In detail, Fourier transform of the sound data into a frequency domain is performed, and the operating frequency information of the motor of another home appliance may be acquired from the transformed result.

The operating frequency of the motor of the home appliance, which differs from the operating frequency of the motor of another home appliance, is identified based on the acquired operating frequency information (S620). In detail, the operating frequency of the motor 110 having a difference greater than or equal to a predetermined value from the operating frequency of the motor of another home appliance may be identified. Herein, the predetermined value is a difference value between the operating frequencies for preventing noise caused by the above-described beat phenomenon, and may be about 2 Hz.

More specifically, the operating frequency of the motor of the home appliance may be calculated based on at least one of the environmental information and the setting information of the home appliance.

Here, the environmental information means the information on the surrounding environment of the home appliance and may include various information such as temperature information and humidity information. In addition, the setting information may refer to setting information input from a user, and may include information on a user's use command for a specific function.

In addition, it may be identified whether the difference between the calculated operating frequency and the operating frequency of other home appliances in the acquired operating frequency information is within the predetermined difference.

If the difference is within the predetermined difference, the calculated operating frequency may be corrected so that the calculated operating frequency and the operating frequency of another home appliance are different by the predetermined value or more. On the other hand, if the difference is greater than the predetermined difference, the calculated operating frequency may be identified as the operating frequency of the motor.

The operation of the motor of the home appliance is controlled based on the identified operating frequency (S630). Specifically, at least one of an operation of the motor corresponding to a current cycle of the home appliance and an operation of the motor corresponding to a next cycle of the home appliance may be controlled based on the identified operating frequency.

Meanwhile, another home appliance may include a plurality of motors, and the home appliance may include one motor. In this case, the plurality of operating frequency information on each of the plurality of motors can be acquired from another home appliance.

The operating frequency which differs from the operating frequencies for each of the plurality of motors of another home appliance may be identified based on the plurality of acquired operating frequency information. The operation of the motor 110 may be controlled according to the identified operating frequency.

In addition, another home appliance may include one motor, and the home appliance may include a plurality of motors. In this case, the operating frequency information corresponding to one motor can be acquired from another home appliance.

The operating frequencies for each of the plurality of motors of the home appliance, which differs from the operating frequency of the motor of another home appliance, may be identified based on the acquired operating frequency information. The operations of each of the plurality of motors 110 may be controlled according to the plurality of identified operating frequencies.

Therefore, as described above, the method for controlling a home appliance according to the disclosure controls the motor according to the operating frequency which differs from the operating frequency of the motor included in another home appliance disposed at an adjacent location, thereby making it possible to prevent the beat phenomenon that may be caused by the motors operating at the similar operating frequencies. The control method as illustrated in FIG. 6 may be executed on the home appliance having the configuration of FIG. 1 or FIG. 2 or be executed even on the home appliance having other configurations.

In addition, the control method as described above may be implemented as at least one execution program for executing the control method as described above, and the execution program may be stored in a non-transitory computer readable medium.

The non-transitory computer readable medium is not a medium that stores data therein for a while, such as a register, a cache, a memory, or the like, but means a medium that semi-permanently stores data therein and is readable by a device. In detail, various applications or programs described above may be stored and provided in the non-transitory computer readable medium such as a compact disk (CD), a digital versatile disk (DVD), a hard disk, a Blu-ray disk, a universal serial bus (USB), a memory card, and a read only memory (ROM).

FIG. 7 is a sequence diagram for describing the method for controlling a home appliance according to the embodiment of the disclosure.

First, the first home appliance 100-1 and the second home appliance 100-2 may identify each other as adjacent home appliances through communication (S710). In detail, when the first home appliance 100-1 and the second home appliance 100-2 may be connected to the same network or can perform direct communication, the first home appliance 100-1 and the second home appliance 100-2 may identify each other as adjacent home appliances.

The first home appliance 100-1 may request the second home appliance 100-2 for the operating frequency information on the motor included in the second home appliance 100-2 (S720). The first home appliance 100-1 may receive the operating frequency information on the motor included in the second home appliance 100-2 from the second home appliance 100-2 (S730).

The first home appliance 100-1 may compare the operating frequency of the first home appliance 100-1 with the operating frequency of the second home appliance 100-2, and identify whether the difference satisfies within 1 Hz (S740). In this case, the operating frequency of the first home appliance 100-1 may correspond to an operating frequency calculated based on at least one of the environmental information and the setting information, but is not limited thereto.

If the difference between the operating frequencies is not within 1 Hz (S740-N), the first home appliance 100-1 may identify to maintain the existing control without changing the operating frequency (S750).

On the other hand, if the difference between the operating frequencies is within 1 Hz (S740-Y), the first home appliance 100-1 may correct the operating frequency (S760). The method for correcting an operating frequency is omitted as it overlaps with the operation of the above-described processor.

The first home appliance 100-1 may control the operation of the motor according to the identified operating frequency (S770).

Therefore, as described above, the method for controlling a plurality of home appliances according to the disclosure controls the motor according to the operating frequency which differs from the operating frequency of the motor included in another home appliance disposed at an adjacent location, thereby making it possible to prevent the beat phenomenon that may be caused by the motors operating at the similar operating frequencies. The control method as illustrated in FIG. 7 may be executed on the home appliance having the configuration of FIG. 1 or FIG. 2 or be executed even on the home appliance having other configurations.

In addition, the control method as described above may be implemented as at least one execution program for executing the control method as described above, and the execution program may be stored in a non-transitory computer readable medium.

Hereinabove, the embodiments of the disclosure are illustrated and described, but the disclosure is not limited to the above-mentioned embodiment and may be variously modified by those skilled in the art to which the disclosure pertains without departing from the gist of the disclosure as defined by the following claims. In addition, these modifications are to fall within the scope of the following claims.

What is claimed is:

1. A method comprising:
by a home appliance including a microphone and a motor,
detecting a sound generated during driving of a motor included in another home appliance through the microphone;
acquiring operating frequency information of the motor included in the another home appliance from sound data corresponding to the detected sound;
identifying, based on the acquired operating frequency information, an operating frequency of the motor included in the home appliance which differs from an operating frequency of the motor included in the another home appliance; and
controlling an operation of the motor included in the home appliance based on the identified operating frequency.

2. The method as claimed in claim 1, wherein the identifying includes:
calculating the operating frequency of the motor included in the home appliance based on at least one of environmental information or setting information of the home appliance, and
correcting the calculated operating frequency so that the calculated operating frequency and the operating frequency of the motor included in the another home appliance differ by a predetermined value or more when a difference between the calculated operating frequency and the operating frequency of the motor included in the another home appliance in the acquired operating frequency information is within a predetermined difference.

3. The method as claimed in claim 1, wherein the identifying identifies the operating frequency of the motor included in the home appliance having a difference greater than or equal to a predetermined value from the operating frequency of the motor included in the another home appliance.

4. The method as claimed in claim 3, wherein the predetermined value is 2 Hz.

5. The method as claimed in claim 1, wherein the home appliance is a first home appliance and the another home appliance is a second home appliance, and the method further comprising, prior to the acquiring:
by the first home appliance,
identifying a home appliance that is adjacent to the first home appliance, wherein the identified home appliance is the second home appliance,
wherein the acquiring acquires the operating frequency information from the identified home appliance, which is the second home appliance.

6. The method as claimed in claim 5, wherein
the identifying the home appliance comprises:
identifying, as the home appliance that is adjacent to the first home appliance, a home appliance that is connected to a same network as the first home appliance or that is capable of direct communication with the first home appliance, wherein the identified home appliance is the second home appliance, and
the acquiring includes:
requesting, from the identified home appliance, which is the second home appliance, the operating frequency information on the motor included in the second home appliance, and
receiving, from the identified home appliance, which is the second home appliance, the requested operating frequency information.

7. The method as claimed in claim 1, wherein the operation controlled by the controlling is at least one of an operation of the motor included in the home appliance corresponding to a current cycle of the home appliance and an operation of the motor included in the home appliance corresponding to a next cycle of the home appliance.

8. The method as claimed in claim 1, wherein
the another home appliance includes a plurality of motors,
the acquiring acquires a plurality of operating frequency information of the plurality of motors included in the another home appliance, respectively, and
the identifying identifies an operating frequency of the motor included in the home appliance which differs from operating frequencies for the plurality of motors included in the another home appliance, based on the acquired plurality of operating frequency information.

9. The method as claimed in claim 1, wherein
the home appliance includes a plurality of motors,
the identifying identifies a plurality of operating frequencies of the plurality of motors included in the home appliance, respectively, which differ from the operating frequency of the motor included in the another home appliance, based on the acquired operating frequency information, and
the controlling controls operations of each of the plurality of motors included in the home appliance, based on the identified plurality of operating frequencies.

10. A home appliance, comprising:
a motor;
a microphone; and
a processor configured to
detect a sound generated during driving of a motor included in another home appliance through the microphone,
acquire operating frequency information of the motor included in the another home appliance from sound data corresponding to the detected sound,
identify, based on the acquired operating frequency information, an operating frequency of the motor included in the home appliance which differs from an operating frequency of the motor included in the another home appliance, and control an operation of the motor included in the home appliance based on the identified operating frequency.

11. The home appliance as claimed in claim 10, wherein, to identify the operating frequency of the motor included in the home appliance, the processor is configured to calculate the operating frequency of the motor included in the home appliance based on at least one of environmental information and setting information of the home appliance, and correct the calculated operating frequency so that the calculated operating frequency and the operating frequency of the motor included in the another home appliance differ by a predetermined value or more when a difference between the calculated operating frequency and the operating frequency of the motor included in the another home appliance in the acquired operating frequency information is within a predetermined difference.

12. The home appliance as claimed in claim 10, wherein, to identify the operating frequency of the motor included in the home appliance, the processor is configured to identify the operating frequency of the motor included in the home appliance having a difference greater than or equal to a predetermined value from the operating frequency of the motor included in the another home appliance.

13. The home appliance as claimed in claim 12, wherein the predetermined value is 2 Hz.

14. The home appliance as claimed in claim 10, wherein the home appliance is a first home appliance and the another home appliance is a second home appliance, the processor is configured to, prior to acquiring the operating frequency information, identify a home appliance that is adjacent to the first home appliance, wherein the identified home appliance is the second home appliance, and, to acquire the operating frequency information, the processor is configured to acquire the operating frequency information from the identified home appliance, which is the second home appliance.

15. The home appliance as claimed in claim 14, wherein, to identify the home appliance that is adjacent to the first home appliance, the processor is configured to identify, as the home appliance that is adjacent to the first home appliance, a home appliance that is connected to a same network as the first home appliance or that is capable of direct communication with the first home appliance, wherein the identified home appliance is the second home appliance, and, to acquire the operating frequency information, the processor is configured to request, from the identified home appliance, which is the second home appliance, the operating frequency information on the motor included in the second home appliance, and receive, from the identified home appliance, which is the second home appliance, the requested operating frequency information.

16. The home appliance as claimed in claim 10, wherein the controlled operation is at least one of an operation of the motor included in the home appliance corresponding to a current cycle of the home appliance and an operation of the motor included in the home appliance corresponding to a next cycle of the home appliance.

17. The home appliance as claimed in claim 10, wherein the another home appliance includes a plurality of motors, to acquire the operating frequency information, the processor is configured to acquire a plurality of operating frequency information of the plurality of motors included in the another home appliance, respectively, and, to identify the operating frequency of the motor included in the home appliance, the processor is configured to identify an operating frequency of the motor included the home appliance which differs from operating frequencies for the plurality of motors included in the another home appliance, based on the acquired plurality of operating frequency information.

18. The home appliance as claimed in claim 10, wherein the motor includes a plurality of motors, and, to identify the operating frequency, the processor is configured to identify a plurality of operating frequencies of the plurality of motors included in the home appliance, respectively, which differ from the operating frequency of the motor included in the another home appliance, based on the acquired operating frequency information, and, to control the operation of the motor, the processor is configured to control operations of each of the plurality of motors included in the home appliance, based on the identified plurality of operating frequencies.

* * * * *